No. 634,853. Patented Oct. 10, 1899.
J. F. MILLER.
WRENCH.
(Application filed Jan. 21, 1899.)
(No Model.)
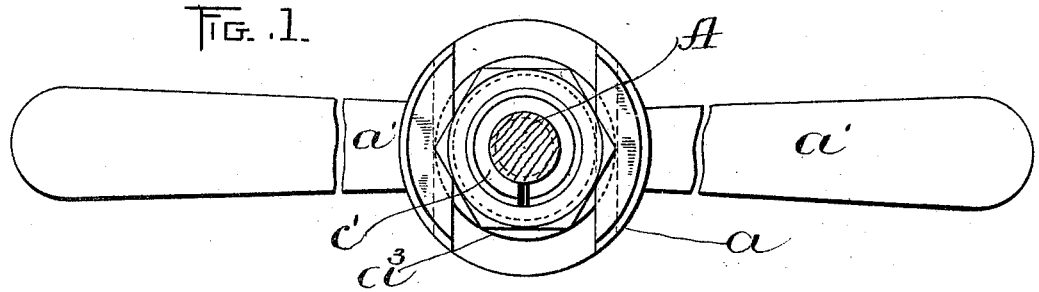
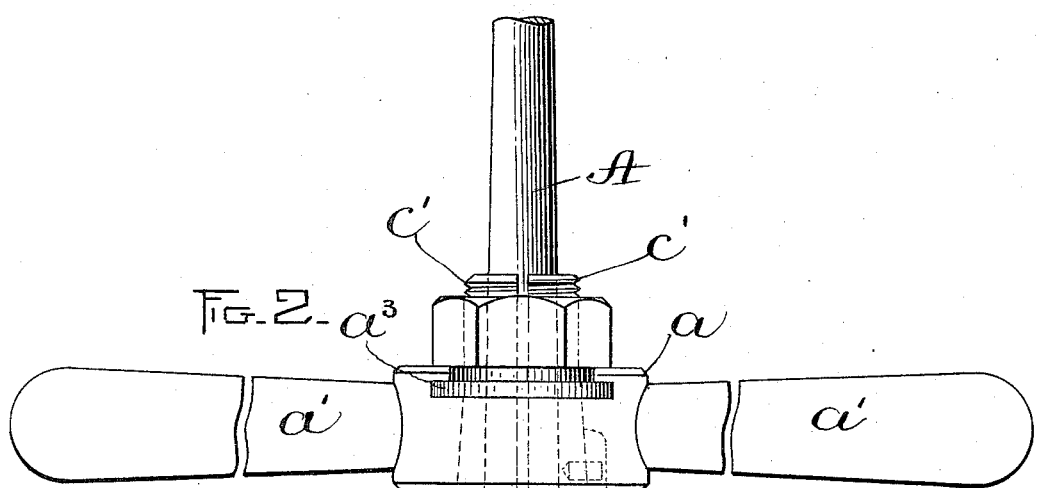
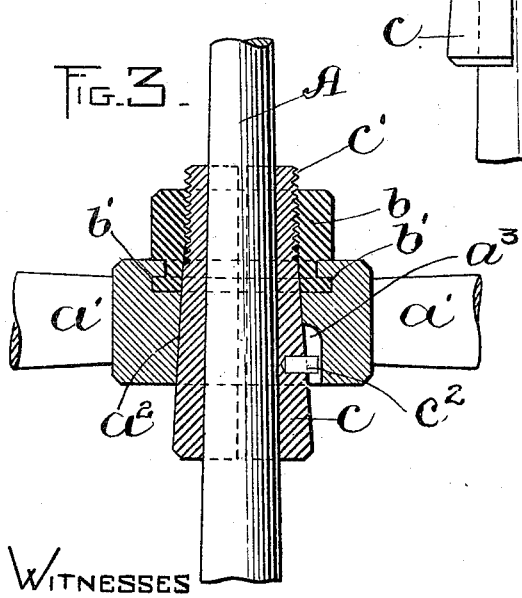
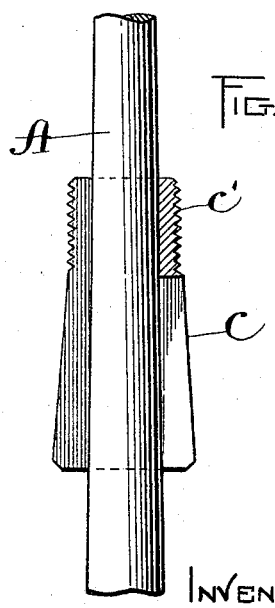
Witnesses
A. D. Harrison
P. W. Pizzetti
Inventor:
John F. Miller
by Hughs, Brown & Quinby
attys.
THE NORRIS PETERS CO., PHOTO-LITHO., WASHINGTON, D. C.

UNITED STATES PATENT OFFICE.

JOHN F. MILLER, OF SAUNDERSVILLE, MASSACHUSETTS, ASSIGNOR TO THE WOONSOCKET MACHINE AND PRESS COMPANY, OF WOONSOCKET, RHODE ISLAND.

WRENCH.

SPECIFICATION forming part of Letters Patent No. 634,853, dated October 10, 1899.

Application filed January 21, 1899. Serial No. 702,887. (No model.)

*To all whom it may concern:*

Be it known that I, JOHN F. MILLER, of Saundersville, in the county of Worcester and State of Massachusetts, have invented certain new and useful Improvements in Wrenches, of which the following is a specification.

This invention has relation to wrenches or tools of a similar nature, and has for its object to provide a device of the character specified which may be employed for withdrawing shafts, spindles, or other parts from textile and other machines without marring or injuring them.

To this end the invention consists of a tool having certain features of construction and arrangement of parts, all as illustrated upon the accompanying drawings, now to be described in the following specification, and pointed out with particularity in the appended claims.

Reference is to be had to the accompanying drawings, and to the letters marked thereon, forming a part of this specification, the same letters designating the same parts or features, as the case may be, wherever they occur.

Of the said drawings, Figure 1 represents a tool embodying my invention. Fig. 2 represents the same in front elevation. Fig. 3 represents a longitudinal section therethrough. Fig. 4 represents a spindle with one of the clamps.

On the drawings, $a$ indicates a hub, laterally from which project handles $a'$ $a'$, by means of which it may be rotated. Through the center of the hub extends a tapering hole or aperture $a^2$, and across the face of the said hub is a groove $a^3$, having undercut edges.

$b$ is a nut having its lower edge adapted to slide in the groove $a^3$, having tongues $b'$ $b'$, which project under the overhanging edges of the groove.

$c$ represents a tubular bushing, which is split to form a clamp or clamps and is provided with an aperture extending throughout its length. It tapers, as shown, and is threaded at its smaller end, as at $c'$, to receive the nut $b$. A pin $c^2$ on the bushing extends into an internal groove or keyway $a^4$ in the hub, so as to hold the said bushing and hub against rotation relatively to each other, although the bushing can slide through the hub to contract the clamp members.

In order to withdraw the shaft or a spindle A or any other part of a textile or other machine, the hub, the bushing, and nut are slipped over its end. The hub is held stationary, and the nut is rotated by a wrench or other tool to draw the bushing through the tapering aperture in said hub and cause the clamp members to engage the spindle. When the clamps have been turned far enough into the hub, so as to firmly grip the spindle, the operator by grasping the handles $a'$ can draw longitudinally upon the spindle or shaft to remove it.

It is evident that the spindle will be in no wise injured by the clamps, as they form a long frictional bearing for engaging it. It is also evident that instead of the clamps being formed in one integral part they may be constructed of a plurality of separable sections.

By reason of the nut being separable from the hub I am enabled to employ the same hub with a number of bushings of different sizes, whereby it may be used for withdrawing spindles and shafts of all sizes.

Having thus explained the nature of the invention and described a way of constructing and using the same, though without attempting to set forth all of the forms in which it may be made or all of the modes of its use, I declare that what I claim is—

1. A tool of the character described, comprising a hub having a tapered aperture, a nut rotatively connected to said hub, and a tapered split tubular bushing adapted to be engaged by said nut and drawn into the tapered aperture.

2. A tool of the character described comprising a hub having an aperture, a tapered split tubular bushing adapted to be drawn into said aperture and threaded at its reduced end, and a nut detachably secured to and held against axial movement on said hub for operating said split bushing.

3. A tool of the character described comprising a hub having outwardly-extending handles and having a grooved face, a nut slidably mounted in said groove, said hub and said nut having apertures which can be brought into alinement, and a split bushing adapted to pass through said apertures and be engaged by said nut, whereby the rotation of the nut forces the bushing to grip a shaft or spindle.

4. A tool of the character described comprising a hub, a plurality of separable clamps forming a split through-apertured bushing adapted to be drawn into the said hub, and means journaled on the said hub for engaging said clamps and drawing them in the said hub.

5. A tool of the character described, comprising a hub having an aperture, a tubular split bushing adapted to surround the part to which it is applied, and a nut journaled in the hub for causing said bushing to be contracted to engage said part.

In testimony whereof I have affixed my signature in presence of two witnesses.

JOHN F. MILLER.

Witnesses:
JERRY KEUNVILLE,
LOUIS FARREAU.